United States Patent [19]

Barbe

[11] Patent Number: 5,207,978
[45] Date of Patent: May 4, 1993

[54] NUCLEAR REACTOR CONTROL CLUSTER GUIDE DEVICE

[75] Inventor: Gërard Barbe, Rueil Malmaison, France

[73] Assignee: Framatome, Courbevoie, France

[21] Appl. No.: 762,461

[22] Filed: Sep. 19, 1991

[30] Foreign Application Priority Data

Sep. 20, 1990 [FR] France .............................. 90 11614

[51] Int. Cl.$^5$ .............................................. G21C 1/04
[52] U.S. Cl. .................................................. 376/353
[58] Field of Search ............................... 376/352, 353

[56] References Cited

U.S. PATENT DOCUMENTS

| | | | |
|---|---|---|---|
| 4,562,691 | 1/1986 | Assedo | 53/552 |
| 5,006,305 | 4/1991 | Denizou | 376/353 |
| 5,024,808 | 6/1991 | Land et al. | 376/353 |
| 5,053,189 | 11/1991 | Chrise et al. | 376/353 |

FOREIGN PATENT DOCUMENTS 329536 1/1992 European Pat. Off. .
2397043 6/1978 France .

Primary Examiner—Donald P. Walsh
Assistant Examiner—Frederick H. Voss
Attorney, Agent, or Firm—Pollock, Vande Sande & Priddy

[57] ABSTRACT

A device for guiding a nuclear reactor control cluster comprises guide tubes provided in the fuel assemblies, and in the upper internals, a tubular casing having an upper closure with a hole for passing the cluster drive shaft, horizontal guide plates spaced apart along the casing and cut out so as to let the spider pass and to guide the elements of the cluster, and split tubes for guiding individual elements for protecting the elements from the action of the coolant. Openings are provided immediately below the plates at the top of each internal between the guide plates. The guide tubes in a lower portion of the casing are devoid of openings other than to a slit for passage of a spider carrying the cluster.

8 Claims, 3 Drawing Sheets

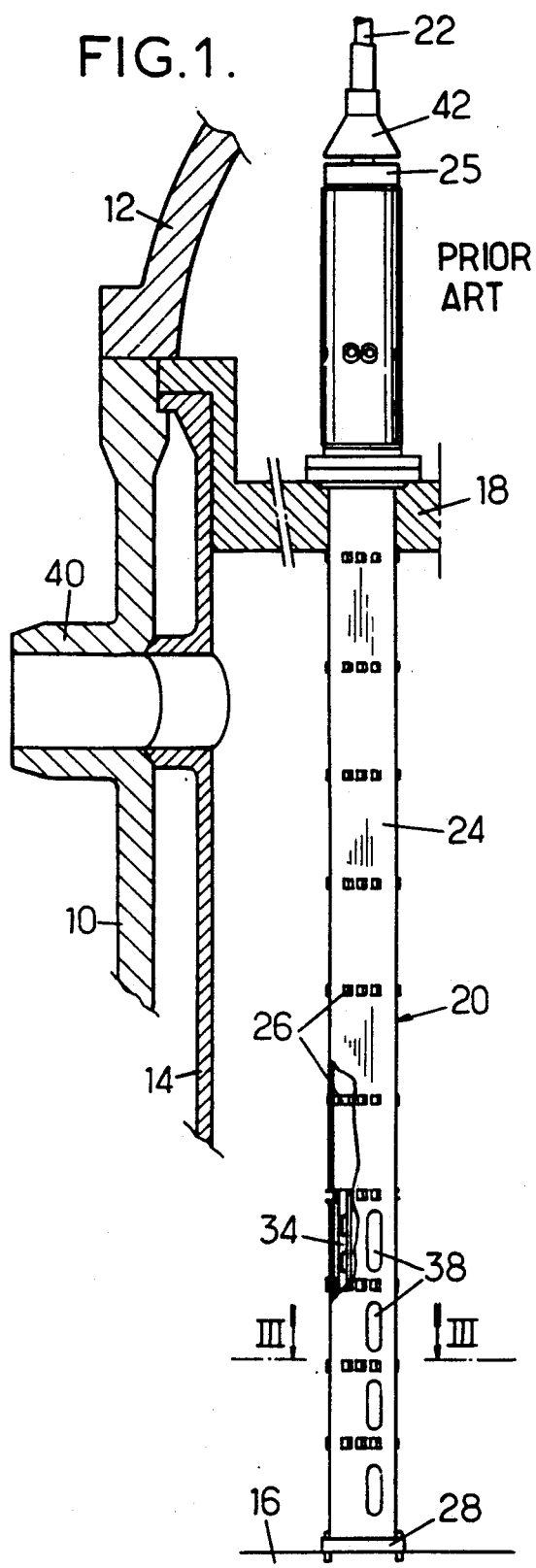
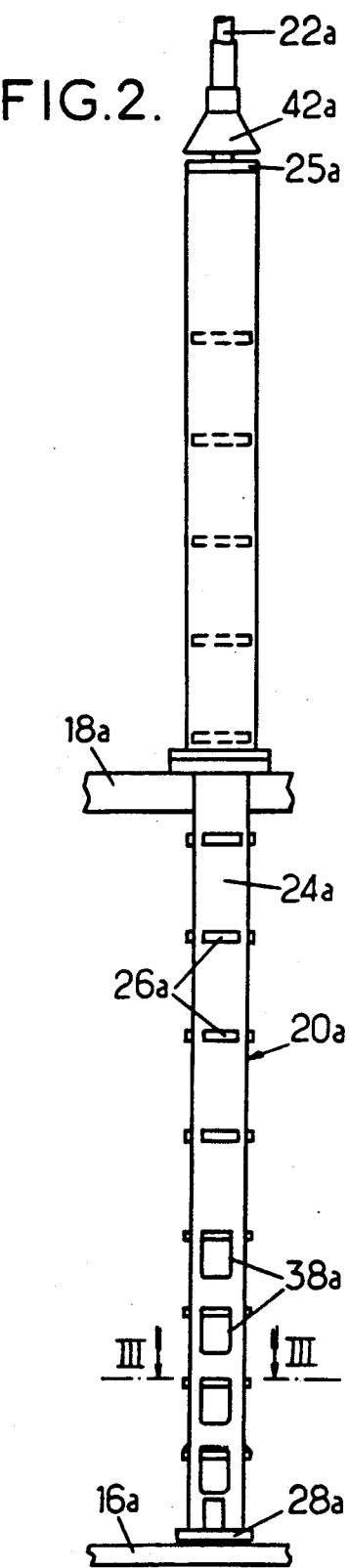

PRIOR ART

NUCLEAR REACTOR CONTROL CLUSTER GUIDE DEVICE

FIELD OF THE INVENTION

The present invention relates to a nuclear reactor control cluster guide device, and is particularly suitable for use in pressurized water reactors and, among the latter, in thermal neutron reactors or spectral shift reactors.

BACKGROUND OF THE INVENTION

In present day pressurized water reactors (PWRs), the reactivity is controlled mainly with control clusters each comprising a bundle of elongated elements suspended from a spider with radial arms carried by a vertical cluster drive shaft, for moving the cluster between a lower position in which it is inserted almost completely in the core of the reactor and an upper position in which it is situated in the upper internal equipment of the reactor.

The elements are guided in the core by guide tubes provided in the fuel assemblies. Above the core, these elements, which are very long and thin, must be guided in the upper internals by a device which may comprise: a tubular casing, having, at its upper part, a closure plate formed with a hole for passing the drive shaft therethrough; horizontal plates spaced apart along the casing and cut out to let the spider pass and to guide the elements; means for continuously guiding the elements in the low part of the casing, formed by guide tubes for individual elements and/or by guide sleeves for pairs of elements each having a slit of sufficient width to let an arm of the spider pass, in the intervals between the lowest plates, intended to protect the elements from the action of the turbulent flow of coolant which leaves the core and is deflected towards coolant outlet openings formed in the casing and situated in said intervals and to avoid buckling of the elements when the cluster is released and falls while being braked by the dash-pot effect of the guide tubes.

Up to now, attempts have been made to reduce as much as possible the pressure gradients which are exerted on the elements in a horizontal direction, in the above-mentioned intervals. Such attempts have been based on the assumption that such pressure gradients apply the elements against the lips of the slit through which the spider passes and cause frictional wear of the elements. To achieve pressure balancing, pressure equalizing holes have been formed in the wall of the guide sleeves; the sleeves have been replaced by castings leaving a pressure balancing clearance (U.S. Pat. No. 5,006,305); and indentations have been formed in the lips of the slit which constitute pressure balancing openings (U.S. Pat. No. 4,562,038). The subjects matter of such patents are included in the present specification by reference. Other examples of prior art guiding devices may be found in French Patent No. 2 397 043 (WESTINGHOUSE) and European No. 329,536 (FRAMATOME).

SUMMARY OF THE INVENTION

The present invention is based on the finding that, at least in certain types of reactors cause of wear of the elements and of the plates is vibration of the elements stimulated by pressure oscillations within the flow, and it is an object of the invention to reduce such stimulation. For that purpose, there is provided a guide device of the above-defined type in which the openings are formed immediately below the plates at the top of each gap; the tubes for guiding a single element are without openings, so as to generate a differential pressure which applies the element against the tube and prevents it from being driven by the coolant which flows towards the openings; and the lowest plate has such a cut-out that it offers to the coolant a flow cross-sectional area greater than that of the plates placed above and defining said intervals, so as to better distribute the flow leaving the casing through said openings.

The openings advantageously have a rectangular shape and terminate upwardly at the horizontal level of the transverse plates, this prevents local reversal of the fluid streams and reduces the pressure oscillations.

The internal edges of the sleeves guiding two elements carried by a same spider arm are typically shaped so as to reduce the flow speed between the sleeves and thus the intensity of pressure fluctuations. The sleeves are advantageously devoid of coolant passage apertures in their upper part, so as to generate pressure differences biasing the elements placed closest to the axis of the casing and avoiding their being driven by the flow of coolant.

Conventional guide devices generally comprise a frusto-conical guide, flaring out downwardly, placed above the closing plate of the casing and intended to center the control rod of the cluster during closure of the lid of the vessel of the reactor. The pressure differential which appears during operation between the two faces of the closure plate of a casing may cause a turbulent flow in the annular clearance which exists between the wall of the hole in the plate and the shaft. The turbulent flow, upward or downward, depending on the case, causes excitation of the rod, particularly in the case of a rising flow which undergoes a double change of direction caused by the conical guide. Such excitation is transmitted to the elements by the spider. The vibrations which result therefrom cause additional wear of the top part of the elements, which strike the horizontal guide plates when they oscillate.

It is an ancillary object of the invention to reduce the vibrations having the above identified cause and the attendant corrosion; for that purpose there are provided, in the frusto-conical guide, slit-shaped apertures spaced evenly angularly apart, advantageously elongated in the longitudinal direction and facilitating upward flow of the coolant, particularly by avoiding a double change of direction and acceleration.

BRIEF DESCRIPTION OF THE DRAWINGS

The invention will be better understood from the following description of a particular embodiment, given by way of example and with reference to the accompanying drawings in which, FIG. 1 shows a prior art type of cluster guide device, in elevation, and the elements of the upper internals which are directly associated therewith, in cross-section in a vertical plane;

FIG. 2, similar to FIG. 1, is an elevational view of a guide device according to a particular embodiment of the invention;

FIG. 3 is a sectional view, through a horizontal plane, at the level of lines III—III of FIGS. 1 and 2, wherein the lower half shows a prior art construction of a guide plate and sleeves, and the upper half shows a construction according to an embodiment of the invention;

FIGS. 4 and 5 are elevational views of sleeves which can be used in a device according to the invention, seen in a direction orthogonal to the plane defined by the two elements which they guide (line V—V of FIG. 3)

DESCRIPTION OF PREFERRED EMBODIMENT

Figure 6:
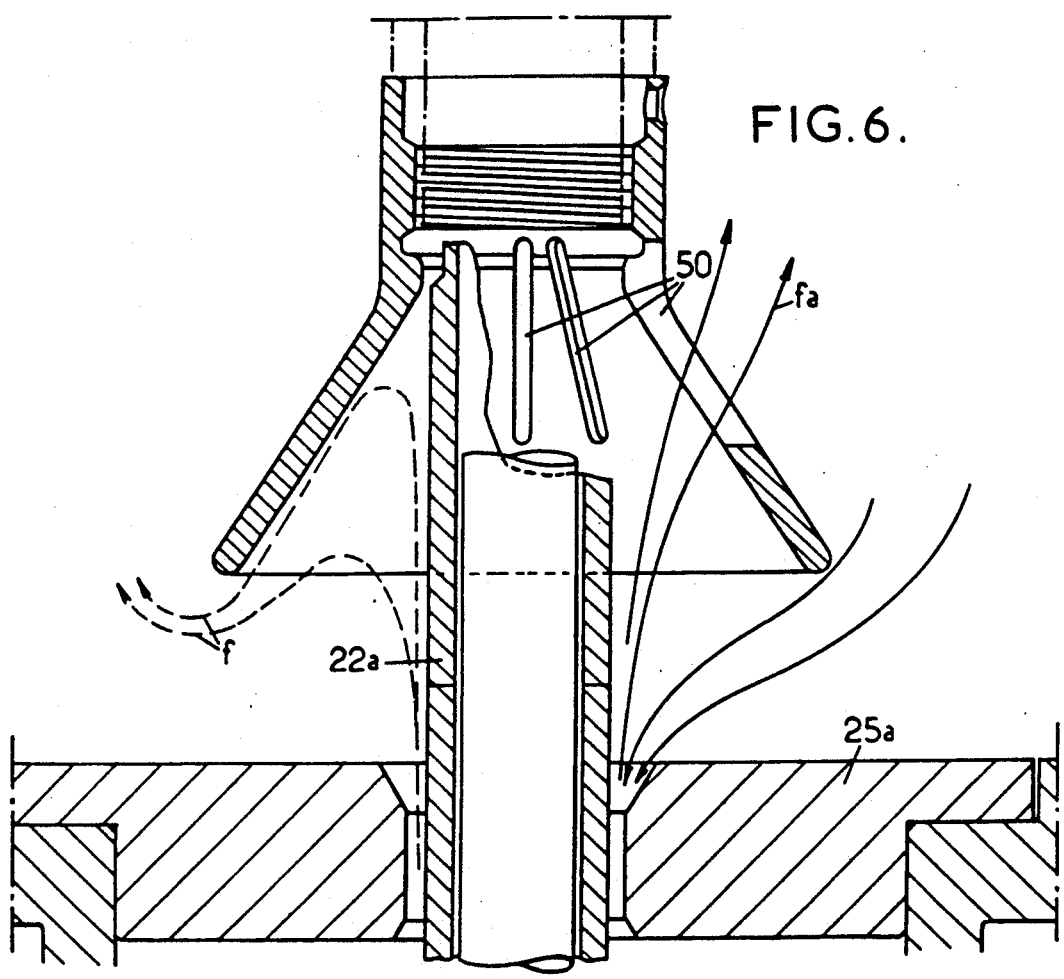
FIG. 6 shows a frusto-conical guide of a guide device according to a particular embodiment of the invention, shown in cross-section along a vertical plane.

The reactor partially shown schematically in FIG. 1 has a general construction which is well-known at the present time and is, for instance, as disclosed in U.S. Pat. No. 4,092,216. It will therefore be described only.

The core is formed of mutually juxtaposed fuel assemblies and contained in a pressure vessel 10 closed by a lid 12. A shroud 14, supported by the vessel, defines an annular space through which the coolant admitted by nozzles (not shown), flows down to the space formed under a lower plate carrying the core. The coolant then rises through the core and leaves it through passages formed in an upper core plate 16 belonging to the upper internals of the reactor.

The internals also comprise a support plate 18, supported by the vessel, connected to the core plate by structural columns (not shown), and by guide devices 20, each for receiving a control cluster. The clusters are formed of a bundle of elongated elements containing neutron absorbent material, e.g., twenty-four in number suspended from a "spider" fixed to a drive shaft 22.

Each device 20 comprises, between plates 16 and 18, a tubular casing 24, of approximately square section as shown and, above the support plate 18, an extension having a closure plate 25, formed with a hole for passage of the drive shaft 22 therethrough. Horizontal guide plates 26 are evenly spaced apart along casing 24. They are fixed to the casing by external projections of the plates engaged in slots of the casing 24, and generally by welding.

Those plates 26 which are situated at the upper part of casing 24, six in number in the embodiment shown in FIG. 1, have an internal cut-out such that the plates guide the elements and leave the arms of the spider free to move. The elements are thus guided discontinuously, at intervals corresponding to the spacing between plates 26.

Figures 3, 4, 5:
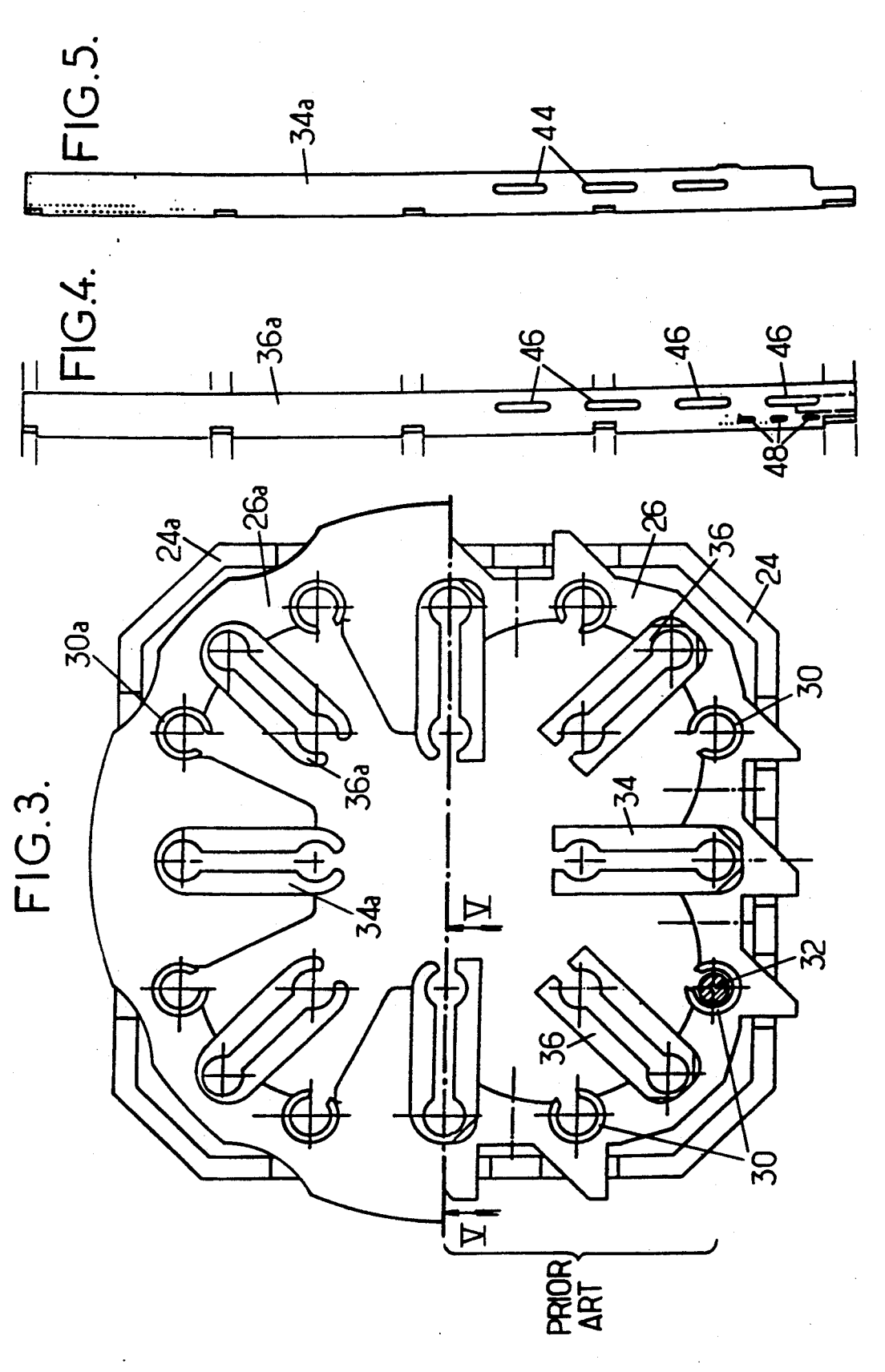

The lower plates, four in number in the embodiment shown in FIG. 1, are connected together and to the foot 28 of casing 24 by continuous guide means, and are securely connected to the casing, for instance by welding. As shown in FIG. 3, the guide means are formed as split tubes 30, each intended to receive an element, such as the element shown at 32, and as sleeves 34 and 36 each guiding a pair of elements carried by a same arm of the spider.

Openings 38, elongated in the vertical direction, are formed in casing 24 in the continuous guide zone. These openings 38 constitute a path for the coolant from the core into the manifold defined by plates 16 and 18 and by shroud 14; from there, the coolant flows out of the reactor through nozzles 40.

Finally, the guide device comprises a frusto-conical guide 42 for centering the drive shaft 22, when lid 12 is being positioned on the vessel. In general, the pressures are not balanced across the closure plate 25, which causes a turbulent flow in the annular clearance, between the wall of the hole in the plate and shaft 22. This flow may be upward or downward. When it is upward, it forms a jet which, before being diffused, is subjected to a double reversal, as shown by arrows f on FIG. 6. The turbulence of such a flow causes considerable excitation of the shaft which is communicated to the elements by the spider.

The guide device according to the invention, a specific construction of which is shown in FIG. 2, considerably reduces the wear phenomenon due to vibrations of the elements.

The device of FIG. 2, where the elements corresponding to those of FIG. 1 have the same reference numbers to which the index A has been added, may often replace that of FIG. 1 in an existing reactor as a retrofit. Again, it comprises a casing 28a to which horizontal guide plates 26a are fixed. The four lower plates 26a and the foot 28a of the device are again connected together by continuous guide means, formed of tubes 30a, and sleeves 34a and 36a (top part of FIG. 3) which pass through the plates, and connected to casing 24a, for instance by welding.

As shown in FIG. 2a, the openings 38a have an approximately rectangular shape and are placed just below those plates 26a which are in the continuous guide zone. Each opening 38a extends as far as the plate 26a placed above it.

To better distribute the flow which leaves the core among the superposed openings 38a, the three uppermost plates of the continuous guide zone are preferably formed so that they offer a coolant cross-sectional flow area smaller than the cross-sectional area of the lowest plate. To this end, the internal periphery of the three upper plates may preferably have the cut-out shape shown in the upper half of FIG. 3, while the lowest plate keeps the usual cut-out shape shown in the lower half of FIG. 3. It can be seen that the flow cross-sectional area is reduced in the upper plates by extending the plate inwardly along four sleeves 34a, placed at 90° from each other. As a result, flow occurs in a passage consisting of a central zone and four radially directed zones having a width which only slightly increases radially outwardly. In a modified embodiment, the plate may extend inwardly along all sleeves, for giving a substantially constant width to the radial zones.

To reduce the coolant speed between the sleeves and the pressure fluctuations, the internal end of the sleeves, in the radial direction, is advantageously rounded as shown in FIG. 3.

To generate a pressure differential which applies the elements against the tube wall, each split tube may have a wall without any orifice other than the slit. Sleeves 34a are without apertures in their upper portion, above the second plate, only three elongate apertures 44 (FIG. 5) being left. Sleeves 36a likewise have apertures 46 at their lower part only. These apertures may be completed by two sets of three aligned holes 48, in the low part of the sleeves and in the vicinity of the slit.

All these arrangements significantly reduce the risks of vibrations caused by the flow along the elongated elements.

To reduce the vibrations induced by the flow along drive shaft 22, apertures 50 each in the form of a slit are formed in conical guide 42 to upward flow coolant. The apertures 50 may be in the form of slits spaced evenly angularly apart, elongated in the longitudinal direction and formed at the top part of the guide. Thus, the upward flow takes place in the direction of arrows fa in FIG. 6. Sixteen apertures 50 may typically be used, only three of these being shown schematically in FIG. 6.

What we claim is:

1. In a nuclear reactor, having a core formed of mutually adjacent fuel assemblies, upper internals above the core and a plurality of control clusters each of said guide devices movable, between a lower position in which it is inserted almost completely in the core and an upper position in which it is situated in said upper internals, said control clusters each comprising a bundle of elongated elements suspended from radial arms of a spider carried by a vertical drive shaft, a plurality of control cluster guide devices for guiding a respective one of said control clusters, each comprising:

a plurality of mutually parallel guide tubes provided in one of said fuel assemblies for receiving the elongated elements of one of said control clusters;

a vertical tubular casing located in said upper internals and having, at its upper part, a closure plate formed with a central hole for said drive shaft;

a plurality of horizontal guide plates spaced apart vertically within and along the casing and cut out so as to let the spider pass and to guide said elements at vertical intervals; and means for continuously guiding the elements in a lower part of the casing, formed as tubes for guiding individual elements and sleeves for guiding pairs of elements, each having a vertical slit of sufficient width to let a respective arm of the spider pass, located in intervals between the lowest ones of said horizontal plates, to protect the elements from the action of a turbulent coolant flow which leaves the core upwardly and is deflected towards coolant outlet openings formed in the casing and situated in said intervals, wherein: said openings are formed immediately below the plates defining respective ones of said intervals; the tubes each guiding a single element are devoid of openings additional to said slit, so that a differential pressure appears which applies the elements against the tube wall; and a lowest one of said horizontal guide plates has a cut-out shape defining a flow cross-sectional area greater than that of any one of those horizontal guide plates which are thereabove and define one said interval.

2. Device according to claim 1, wherein the internal edge of each of the sleeves guiding two elements carried by a same arm is shaped so as to reduce the flow speed between the sleeves.

3. Device according to claim 2, wherein each of said sleeves is devoid of coolant fluid passage apertures additional to said slit in an upper part thereof.

4. Device according to claim 1, further comprising a frusto-conical guide flaring downwardly and placed above the closure plate of the casing, formed with slit-shaped apertures which are spaced evenly angularly apart to facilite upward flow of the coolant.

5. Device according to claim 4, wherein said apertures are elongated vertically.

6. In a pressurized water cooled and moderated nuclear reactor having:

a water pressure resistant vessel, a core in said vessel formed of mutually adjacent fuel assemblies, a plurality of control clusters each comprising a bundle of elongated elements suspended from radial arms of a spider and vertically movable downwardly into vertical guide tubes in a respective fuel assembly and upwardly out of the core, upper internals located within the vessel above the core, and a plurality of drive shafts each supporting one of said spiders and each projecting upwardly out of the vessel, a plurality of guide devices each for guiding a respective one of said control clusters located in said upper internals and each comprising:

a tubular casing having a horizontal internal cross-section of sufficient size to accommodate one said cluster;

a closure plate closing the upper end of said casing and formed with a central hole of sufficient size for said drive shaft to move therethrough;

a plurality of horizontal guide plates secured to the casing, spaced apart vertically within and along the casing and cut out for passage of said spider;

wherein upper ones of said guide plates are shaped to individually guide said elongated elements and lower ones of said guide plates are connected by means for continuously guiding the elongated elements in intervals between the guide plates in a lower part of the casing, said means consisting of tubes each for guiding an individual one of said elements and of sleeves each for guiding a radially aligned pair of said elongated elements;

wherein each of said tubes and sleeves has a vertical slit of sufficient width to allow one arm of the spider to pass;

wherein coolant outlet openings are formed in the casing in intervals between said lower guide plates and terminate upwardly immediately below said lower guide plates;

wherein said tubes of each guiding one elongated element are devoid of openings other than the slit whereby in operation a differential pressure appears across an elongated element when located in a respective tube which forces the elongated elements against the tube wall and prevents it from being driven by a water flow towards the slit;

wherein a lowest one of said horizontal guide plates has an internal cut-out shape offering to water a flow cross-sectional area greater than that of any one of the other lower guide plates, placed thereabove and defining said intervals; and wherein the sleeves are devoid of openings other than the slit in a part thereof above the second lowest guide plate.

7. Device according to claim 6, wherein all of said lower guide plates except the lowest guide plate have a cut-out including extensions along at least some of the sleeves for defining an upwardly directed water flow passage consisting of a central zone and of radially directed zones each having a width which only slightly increases radially outwardly.

8. A guide device for guiding a control cluster consisting of a bundle of mutually parallel elongated elements suspended from radial arms of a spider and vertically movable downwardly in upper internals of a pressurized water nuclear reactor, said device comprising a tubular casing having a horizontal internal cross-section of sufficient size to accommodate one said cluster;

a closure plate closing the upper end of said casing and formed with a central hole of sufficient size for said drive shaft to move therethrough;

a plurality of horizontal guide plates secured to the casing, spaced apart vertically within and along the casing and cut out for passage of said spider;

wherein upper ones of said guide plates are shaped to individually guide said elongated elements and lower ones of said guide plates are mutually connected by means for continuously guiding the elongated elements in intervals between said lower guide plates in a lower part of the casing, said means consisting of a plurality of tubes each for guiding an individual one of said elements and of a plurality of sleeves each for guiding a radially aligned pair of said elongated elements;

wherein each of said tubes and sleeves has a vertical slit of sufficient width to allow one arm of the spider to pass;

wherein coolant outlet openings are formed in the casing in intervals between said lower guide plates and terminate upwardly immediately below said lower guide plates;

wherein said tubes each guiding one elongated element are devoid of openings other than the slit, whereby, in operation, differential pressure appears across an elongated element when located in a respective tube, forcing the elongated elements against the tube wall and preventing them from being driven by water flow towards the slit;

wherein all said lower guide plates except a lowest guide plate have a cut-out including extensions along at least some of the sleeves, defining an upwardly directed water flow passage consisting of a central zone and of radially directed zones each having a width which only slightly increases radially outwardly;

wherein the lowest one of said horizontal guide plates has an internal cut-out shape offering to water a flow cross-sectional area greater than a common flow cross-sectional area of all other lower guide plates; and wherein each of said sleeves is devoid of openings other than the slit in a part thereof above the second lowest guide plate.

* * * * *